United States Patent
Lazaridis et al.

(10) Patent No.: US 9,247,068 B2
(45) Date of Patent: Jan. 26, 2016

(54) APPARATUS, SYSTEM AND METHOD OF CALL NOTIFICATIONS TO ACTIVE COMMUNICATION DEVICES

(75) Inventors: Mihal Lazaridis, Waterloo (CA); Brian Alexander Oliver, Fergus (CA); Andrew Douglas Bocking, Conestogo (CA)

(73) Assignee: BLACKBERRY LIMITED, Waterloo (CA)

( * ) Notice: Subject to any disclaimer, the term of this patent is extended or adjusted under 35 U.S.C. 154(b) by 256 days.

(21) Appl. No.: 13/534,190

(22) Filed: Jun. 27, 2012

(65) Prior Publication Data

US 2014/0003597 A1 Jan. 2, 2014

(51) Int. Cl.
*H04M 3/42* (2006.01)
*H04M 3/54* (2006.01)
*H04M 3/58* (2006.01)
*H04M 3/428* (2006.01)

(52) U.S. Cl.
CPC ............ *H04M 3/543* (2013.01); *H04M 3/4288* (2013.01); *H04M 3/42263* (2013.01); *H04M 3/54* (2013.01); *H04M 3/58* (2013.01)

(58) Field of Classification Search
CPC ......... H04M 3/54; H04M 3/58; H04M 3/543; H04M 1/006
USPC ........... 379/211.01, 211.02, 211.03, 211.042, 379/12.01
See application file for complete search history.

(56) References Cited

U.S. PATENT DOCUMENTS

| | | | |
|---|---|---|---|
| 6,816,583 B2* | 11/2004 | Roeder | 379/212.01 |
| 2007/0019797 A1 | 1/2007 | Morris | |
| 2007/0097994 A1* | 5/2007 | Samdadiya et al. | 370/401 |
| 2007/0116234 A1 | 5/2007 | Schneider et al. | |
| 2008/0292074 A1* | 11/2008 | Boni et al. | 379/93.11 |
| 2008/0316946 A1 | 12/2008 | Capper et al. | |
| 2011/0261945 A1* | 10/2011 | Brock et al. | 379/211.02 |

FOREIGN PATENT DOCUMENTS

| | | |
|---|---|---|
| CA | 2701553 A1 | 10/2010 |
| EP | 1814295 A1 | 8/2007 |

OTHER PUBLICATIONS

European Patent Application No. 12173910.6 Search Report dated Nov. 16, 2012.
Corresponding PCT International Application No. PCT/CA2013/000593 International Search Report mailed Sep. 13, 2013.
Corresponding PCT International Application No. PCT/CA2013/000593 Written Opinion of the International Searching Authority mailed Sep. 13, 2013.

\* cited by examiner

*Primary Examiner* — Nafiz E Hoque
(74) *Attorney, Agent, or Firm* — Perry + Currier Inc.

(57) ABSTRACT

An apparatus, system and method for call notifications to active communication devices are provided. At an apparatus comprising a processor and a communication interface, a call for a first device is received via the communication interface. When is determined that a second device is active, a notification of the call is transmitted to the second device.

13 Claims, 13 Drawing Sheets

APPARATUS, SYSTEM AND METHOD OF CALL NOTIFICATIONS TO ACTIVE COMMUNICATION DEVICES

FIELD

The specification relates generally to communication devices, and specifically to an apparatus, system and method of call notifications to active communication devices.

BACKGROUND

The evolution of computers is currently quite active in the communication device environment. It is now well-known to include calendaring, contacts, and messaging functions in communication devices. More recently, there has been a veritable explosion of the number and type of applications that are configured to the unique form factors and computing environments of communication devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
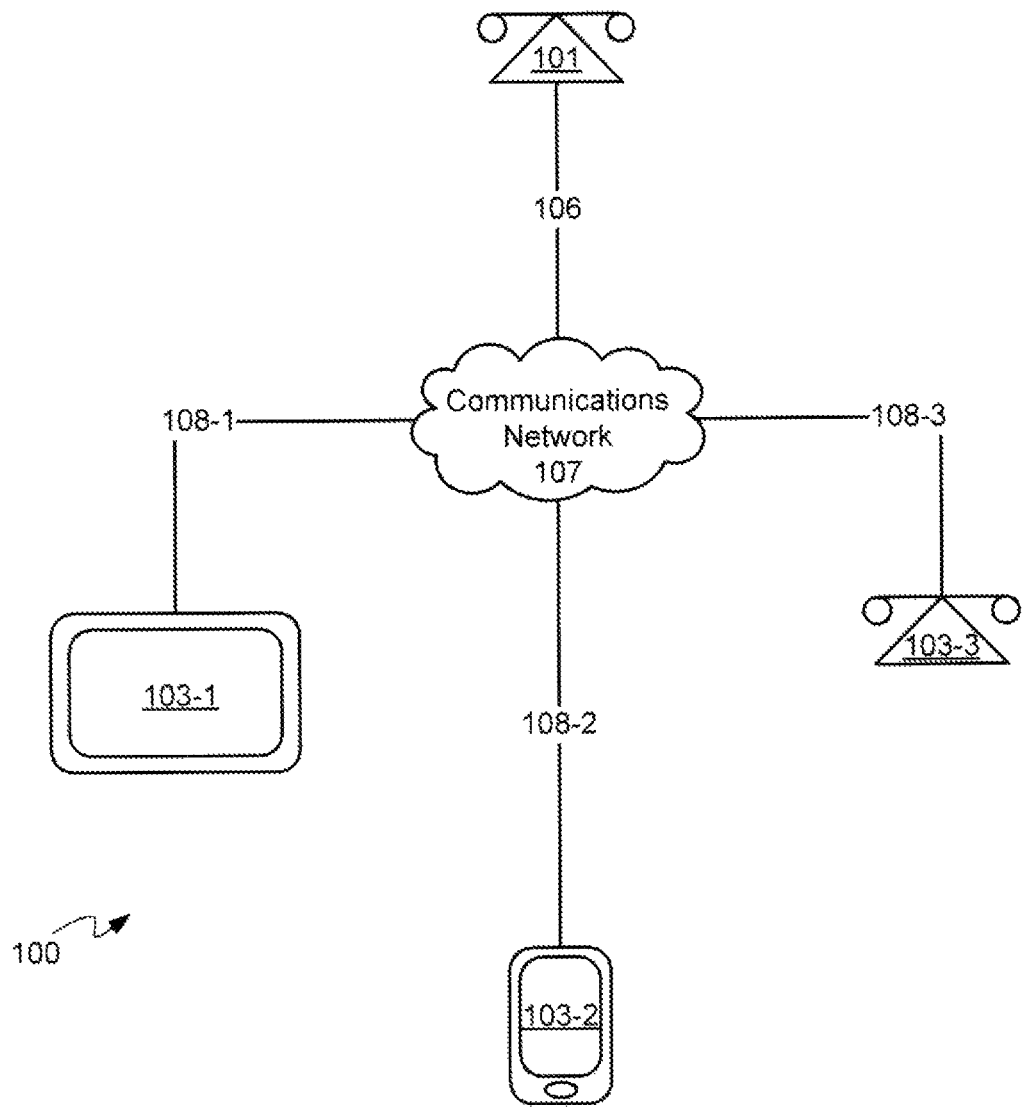
FIG. 1 depicts a system for call notifications to active communication devices, according to non-limiting implementations.

An aspect of the specification provides an apparatus comprising: a processor and a communication interface, the processor enabled to: receive a call for a first device via the communication interface; determine that a second device is active; and transmit a notification of the call to the second device.

The processor can be further enabled to determine that the second device is active by receiving an indication of activity from one or more of the second device and a server enabled to communicate with the first device and the second device. The indication of activity can comprise one or more of: active typing data, motion sensor data, presence data, and human-machine interface data.

The processor can be further enabled to determine that the second device is active by transmitting a query to the second device and receiving a response thereto. The query can comprise a request for capabilities of the second device and the processor can be further enabled to transmit the notification of the call to the second device when the response is indicative that the second device is capable of processing the call.

The processor can be further enabled to: determine that the second device is both active and capable of handling the call; and, transmit the notification of the call to the second device when the second device is both active and capable of handling the call.

The notification can be enabled to trigger a selectable option displayed at the second device for transferring the call to the second device.

The processor can be further enabled to: place the call on hold; and transmit a second notification to a calling device, the second notification indicative of one or more of instructions for waiting and a wait period for answering the call.

The apparatus can further comprise the first device.

The apparatus can further comprise a server enabled to: communicate with the first device and the second device; and, transfer the call to one or more of the first device and the second device.

Another aspect of the specification provides a method comprising: at an apparatus comprising a processor and a communication interface, receiving a call for a first device via the communication interface; determining, at the processor, that a second device is active; and transmitting a notification of the call to the second device.

The method can further comprise determining that the second device is active by receiving an indication of activity from one or more of the second device and a server enabled to communicate with the first device and the second device. The indication of activity can comprise one or more of: active typing data, motion sensor data, presence data, and human-machine interface data.

The method can further comprise determining that the second device is active by transmitting a query to the second device and receiving a response thereto. The query can comprise a request for capabilities of the second device and the method can further comprise transmitting the notification of the call to the second device when the response is indicative that the second device is capable of processing the call.

The method can further comprise: determining that the second device is both active and capable of handling the call; and, transmitting the notification of the call to the second device when the second device is both active and capable of handling the call.

The notification can be enabled to trigger a selectable option displayed at the second device for transferring the call to the second device.

The method can further comprise: placing the call on hold; and transmitting a second notification to a calling device, the second notification indicative of one or more of instructions for waiting and a wait period for answering the call.

The method can further comprise: communicating with the first device and the second device; and, transferring the call to one or more of the first device and the second device.

Yet a further aspect of the specification provides a computer program product, comprising a computer usable medium having a computer readable program code adapted to be executed to implement a method comprising: at an apparatus comprising a processor and a communication interface, receiving a call for a first device via the communication interface; determining, at the processor, that a second device is active; and transmitting a notification of the call to the second device. The computer program product can be non-transitory.

FIG. 1 depicts a system 100 for transmitting call notifications to active devices, according to non-limiting implementations. System 100 comprises a communication device 101 enabled to communicate with at least one of a plurality of communication devices 103-1, 103-2, 103-3, via link 106, a communication network 107, and respective links 108-1, 108-2, 108-3. Communication device 101 will be also referred to hereafter as device 101. This convention will be used elsewhere in the present specification. Devices 103-1, 103-2, 103-3 will also be referred to hereafter generically as a device 103, and collectively as devices 103. Furthermore, links 108-1, 108-2, 108-3 will also be referred to hereafter generically as a link 108, and collectively as links 108. Communications network 107 will also be referred to hereafter as network 107. It is further appreciated that at least one of devices 103 is generally enabled to: receive a call, for example from device 101; determine that a second device 103 is active; and transmit a notification of the call to the second device 103. It is further appreciated that the notification can be transmitted only when the second device 103 is active, and the notification is not transmitted when the second device 103 is inactive.

Device 101 can be any type of electronic device that can be used in a self-contained manner to make calls, for example audio calls, video calls, and the like to one or more of devices 103.

Further, any suitable calls are within the scope of present implementations, including, but not limited to, telephone calls, audio calls, video calls, video chats, PSTN (public switch telephone network) calls, packet based calls, and the like.

It is hence appreciated that device 101 comprises any suitable communication device for communicating with devices 103 including but not limited to any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones, "smart televisions" and the like. Other suitable communication devices are within the scope of present implementations.

Each of devices 103 can be any type of electronic device that can be used in a self-contained manner to interact with a communications network, including but not limited to network 107, via a respective link 108. It is hence appreciated that each device 103 comprises any suitable communication device for communicating with network 107, device 101, and, in some implementations, other devices 103. Each device 103 can include, but is not limited to, any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones" smart televisions" and the like. Other suitable communication devices are within the scope of present implementations.

Further, while three devices 103 are depicted in FIG. 1, it is appreciated that system 100 can comprise any suitable number of communication devices. It is further appreciated that devices 103 can be associated. For example, each of devices 103 can be associated with a user thereof, and hence be associated with one another, for example via a technical association, a database, a list, association data and the like, as will be described below. However, in other implementations association of devices 103 can be via any suitable association; for example each of devices 103 can be a device associated with a corporate entity, including but not limited to a call centre. Hence, devices 103 could be associated with multiple users but within a corporate entity, or the like. Indeed, the association between devices 103 is appreciated to be via a technical association, a database, a list, association data and the like, as will be described below, without necessarily specifying the user, corporate entity or the like in the association. Further, at least one of devices 103 can be enabled to determine whether other of associated devices 103 are active. In some implementations, at least one of devices 103 can be enabled to determine capabilities of other devices 103 and further whether another of devices 103 is capable of processing a given call, as will presently be described.

Each link 106, 108 comprises any suitable link with network 107, including any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, Wi-Fi links, WiMax links, HDMI (High-Definition Multimedia Interface), packet based links, the Internet, analog networks, the PSTN (public switched telephone network), access points, and the like, and/or a combination.

Network 107 can comprise any suitable network and/or combination of networks for conveying a call, including but not limited to audio calls and video calls, between device 101 and one or more of devices 103. Hence, network 107 can comprise any suitable combination of wired networks, wireless networks, cell-phone networks, cellular network networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), access points, and the like.

Figure 2:
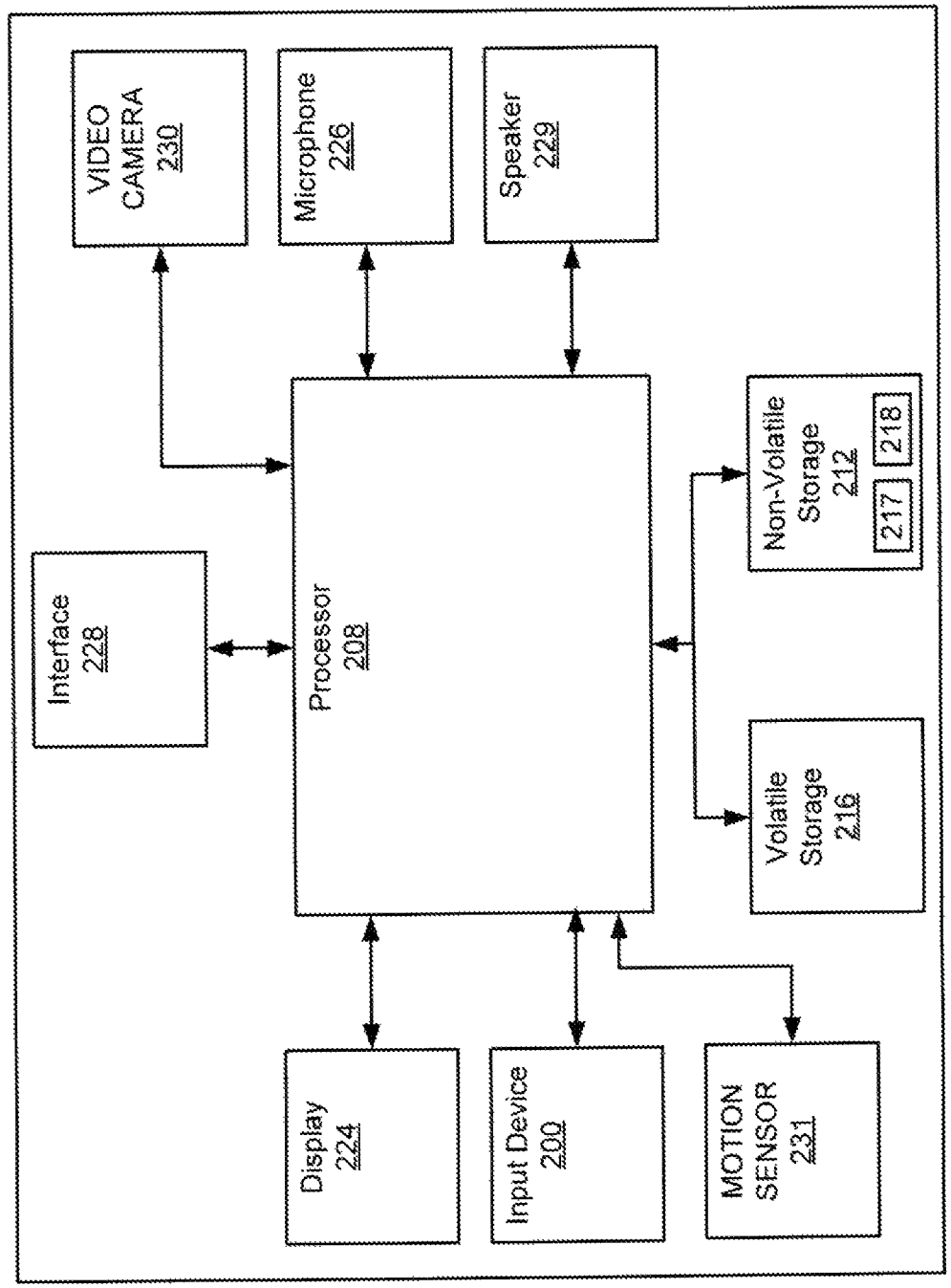
FIG. 2 depicts an apparatus for call notifications to active communication devices, according to non-limiting implementations.

Attention is directed to FIG. 2, which depicts a schematic diagram of a device 103-1 according to non-limiting implementations. It should be emphasized that the structure in FIG. 2 is purely exemplary, and contemplates a device that can be used for both wireless voice (e.g. telephony), video and wireless data communications (e.g. email, web browsing, text, and the like). Device 103-1 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash. Memory) and a volatile storage unit 216 (e.g. random access memory ("RAM")). Programming instructions 217 that implement the functional teachings of device 103-1 as described herein are typically maintained, persistently, in non-volatile storage unit 212 and used by processor 208 which makes appropriate utilization of volatile storage 216 during the execution of such programming instructions. In some implementations, processor 208 can comprise at least a portion of non-volatile storage unit 212, for example as on-board Random Access Memory (RAM). Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Non-volatile storage unit 212 can further store data 218 comprising network identifiers of devices 103 with which device 103-1 is associated, for example devices 103-2, 103-3. Data 218 can include, but is not limited to, any suitable combination of association data, a data base, a list of associated devices 103, and the like. Data 218 can be generated when another device 103 is first associated with device 103-1, and then updated whenever further devices 103 are associated or disassociated with device 103-1. In other words, device 103-1 is enabled to process data 218 to transmit messages, queries and the like to devices 103 whose network identifiers are stored at data 218. In some implementations, data 218 can be used to exchange P2P (peer to peer) data and/or messages with devices 103 whose network identifiers are stored at data 218. In example implementations, it is assumed that data 218 stores network identifiers of devices 103-2, 103-3 and hence, devices 103-2, 103-3 have been previously associated with device 103-1 in any suitable manner.

Processor 208 in turn can also be configured to communicate with a display 224, a microphone 22, a speaker 229, and optionally a video camera 230. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like). In particular, display 224 can be enabled to display video data received from device 101 during a video call Microphone 226 comprises any suitable microphone and/or microphone input for receiving sound data, which can be transmitted to device 101 in one or more of an audio call and a video call. Speaker 229 comprises any suitable speaker for providing sound data at device 103-1, including but not limited to sound data received from device 101 in one or more of an audio call and a video call. Video camera 203, when present, can comprise any suitable video camera for receiving video data which can be transmitted to device 101 in a video call and/or video chat, and the like. It is appreciated that microphone 226, speaker 229 and video camera 230 can be used in combination at device 103-1 to conduct one or more of an audio call and a video call, for example with device 101.

In some implementations, input device 200, display 224, microphone 226, speaker 229, and/or video camera 230 are external to device 103-1, with processor 208 in communication with each of input device 200, display 224, microphone 226, speaker 229, and/or video camera 230 via a suitable connection and/or link.

Processor 208 also connects to a network communication interface 228, also referred to hereafter as interface 228, which can be implemented as one or more radios, and/or one or more network interface cards and/or network adapters configured to communicate over link 108-1. In general, it will be understood that interface 228 is configured to correspond with the network architecture that is used to implement link 108-1. In other implementations a plurality of links with different protocols can be employed and thus interface 228 can comprise a plurality of interfaces to support each link.

It is further appreciated that device 103-1 can be enabled to determine activity at device 103-1; determining activity can include, but is not limited to, determining whether input device 103-1 is in use (for example by determining one or of whether input data is being received at input device 200, typing activity and the like), determining whether an optional motion sensor 231 has detected motion at device 103-1. Motion sensor 231 can comprise any suitable motion sensor, including, but not limited to, any suitable combination of accelerometers, motion detectors, infrared sensors, and the like. In some implementations, activity can be detected via video camera 230 (e.g. when motion is detected within a field of view of video camera 230; in some implementations, activity is detected when video data received at video camera 230 meets an activity condition, for example detection of a user's face in the field of view of the video camera and the like). In yet further implementations, activity can be detected via microphone 226 (e.g. when sound data is received at microphone 226; in some implementations, activity is detected when sound data received at microphone 226 is above a suitable given threshold that is higher than background noise, such that background noise is filtered).

It is further appreciated that device 103-1 can comprise one or more notification devices, including but not limited to display 224, speaker 229, and any other suitable notification device (e.g. lights, LEDs (light emitting diodes), vibration devices, haptic devices and the like (not depicted)).

Indeed, it should be understood that in general a wide variety of configurations for device 103-1 are contemplated.

Figure 3:
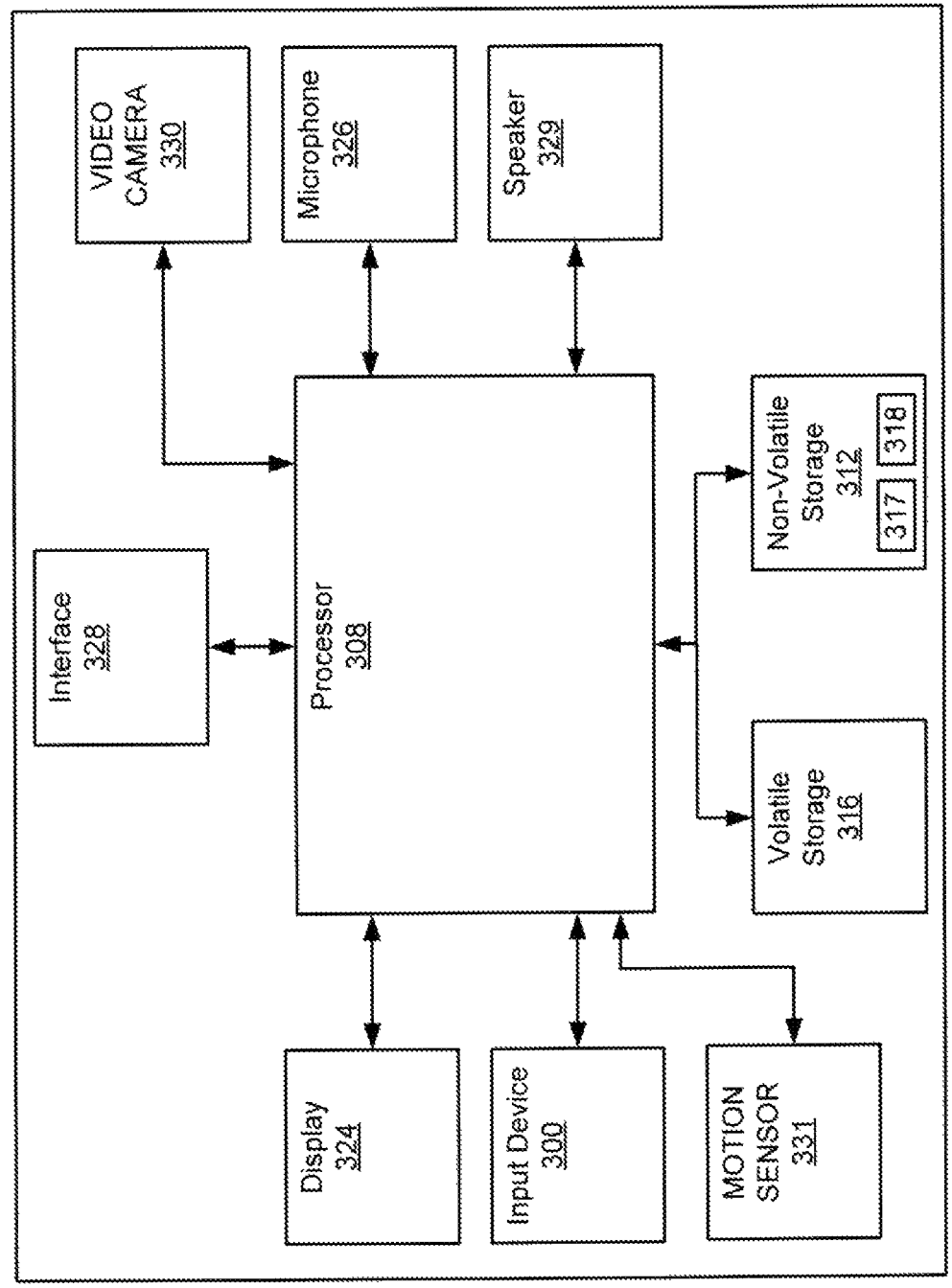
FIG. 3 depicts a device for receiving call notifications, according to non-limiting implementations.

Attention is next directed to FIG. 3, which depicts a schematic diagram of device 103-2 according to non-limiting implementations. It is appreciated that device 103-2 can be substantially similar to, or different from, device 103-1. In any event, FIG. 3 is substantially similar to FIG. 2, with like elements having like numbers, however preceded by a "3" rather than a "2"; for example, processor 308 is substantially similar to processor 208. Specifically, device 103-2 comprises input device 300, processor 308, non-volatile storage unit 312 storing programming instructions 317, volatile storage unit 316, display 324, microphone 326, optional video camera 330, interface 328 and speaker 329, optional motion detector 331, and any suitable notification device. Further non-volatile storage unit 312 stores data 318, similar to data 218, but storing network identifiers of devices 103-1, 103-3. Hence, device 103-2 was previously associated with devices 103-1, 103-3 in any suitable manner.

Figure 4:
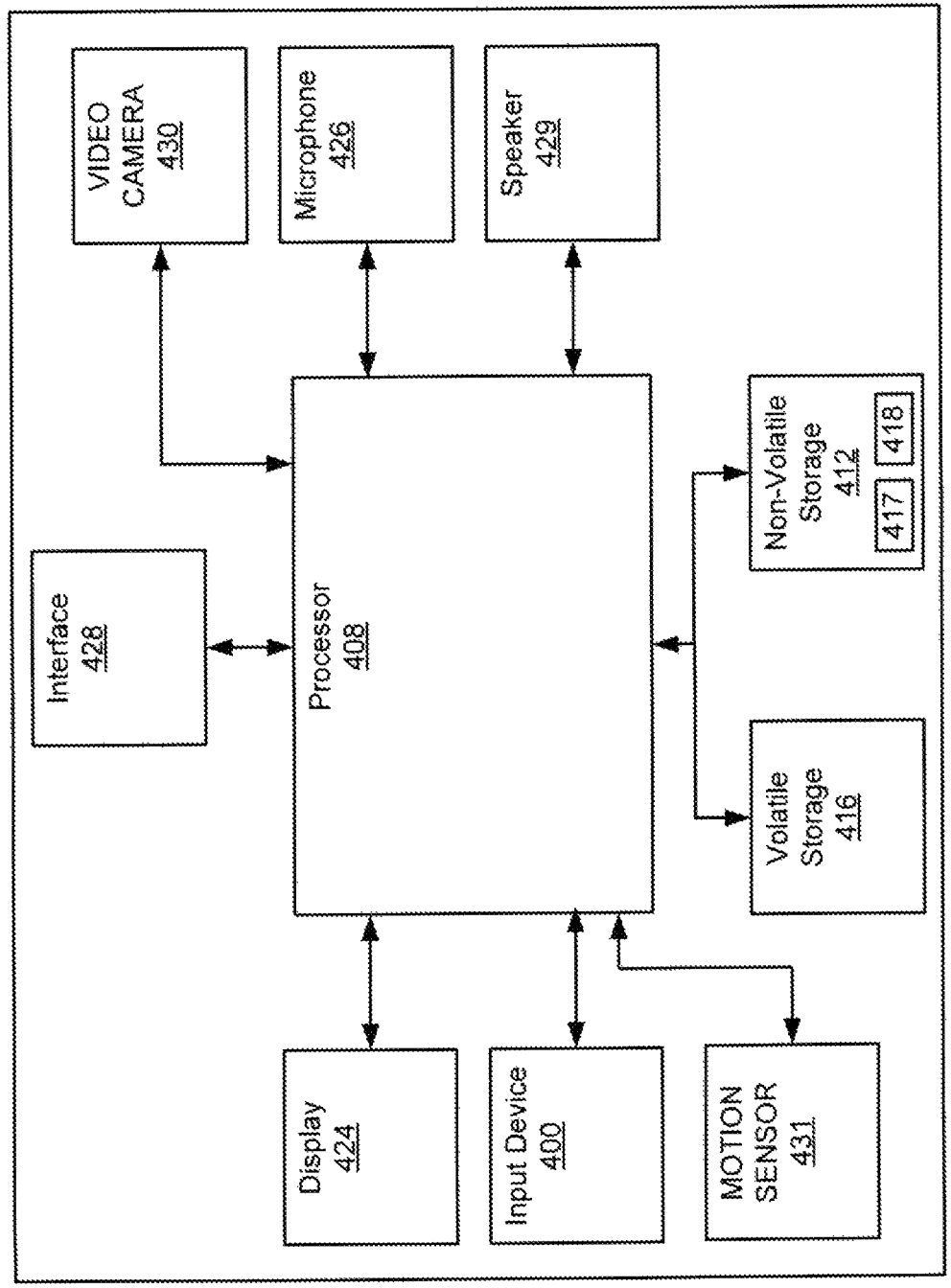
FIG. 4 depicts another device for receiving call notifications, according to non-limiting implementations.

Attention is next directed to FIG. 4, which depicts a schematic diagram of device 103-3 according to non-limiting implementations. It is appreciated that device 103-3 can be substantially similar to, or different from, device 103-1. In any event, FIG. 4 is substantially similar to FIG. 2, with like elements having like numbers, however preceded by a "4" rather than a "2"; for example, processor 408 is substantially similar to processor 208. Specifically, device 103-3 comprises input device 400, processor 408, non-volatile storage unit 412 storing programming instructions 417, volatile storage unit 416, display 424, microphone 426, optional video camera 430, speaker 429, interface 428, an optional motion sensor 431, and any suitable notification device. Further non-volatile storage unit 412 stores data 418, similar to data 218, but storing network identifiers of devices 103-1, 103-2.

Hence, device 103-3 was previously associated with devices 103-1, 103-2 in any suitable manner.

Returning to FIG. 1, is further appreciated that while device 103-1 is depicted as a tablet device, device 103-2 is depicted as a mobile communication device (such as a smartphone, PDA and the like) and device 103-3 is depicted as a desktop phone and/or house phone, present implementations are not so limited. Rather, it is appreciated that FIG. 1 is an example only and that each of devices 103-1, 103-2, 103-3 can comprise any suitable communication device as described above.

It is yet further appreciated that, devices 103 can each be associated with a given user, for example, one of devices 103 comprising the given user's tablet device (e.g. device 103-1), one of devices 103 comprising the given user's mobile communication device (e.g. device 103-2) and one of devices 103 comprising the given user's desk telephone and/or home telephone (e.g. device 103-2).

Figure 13:
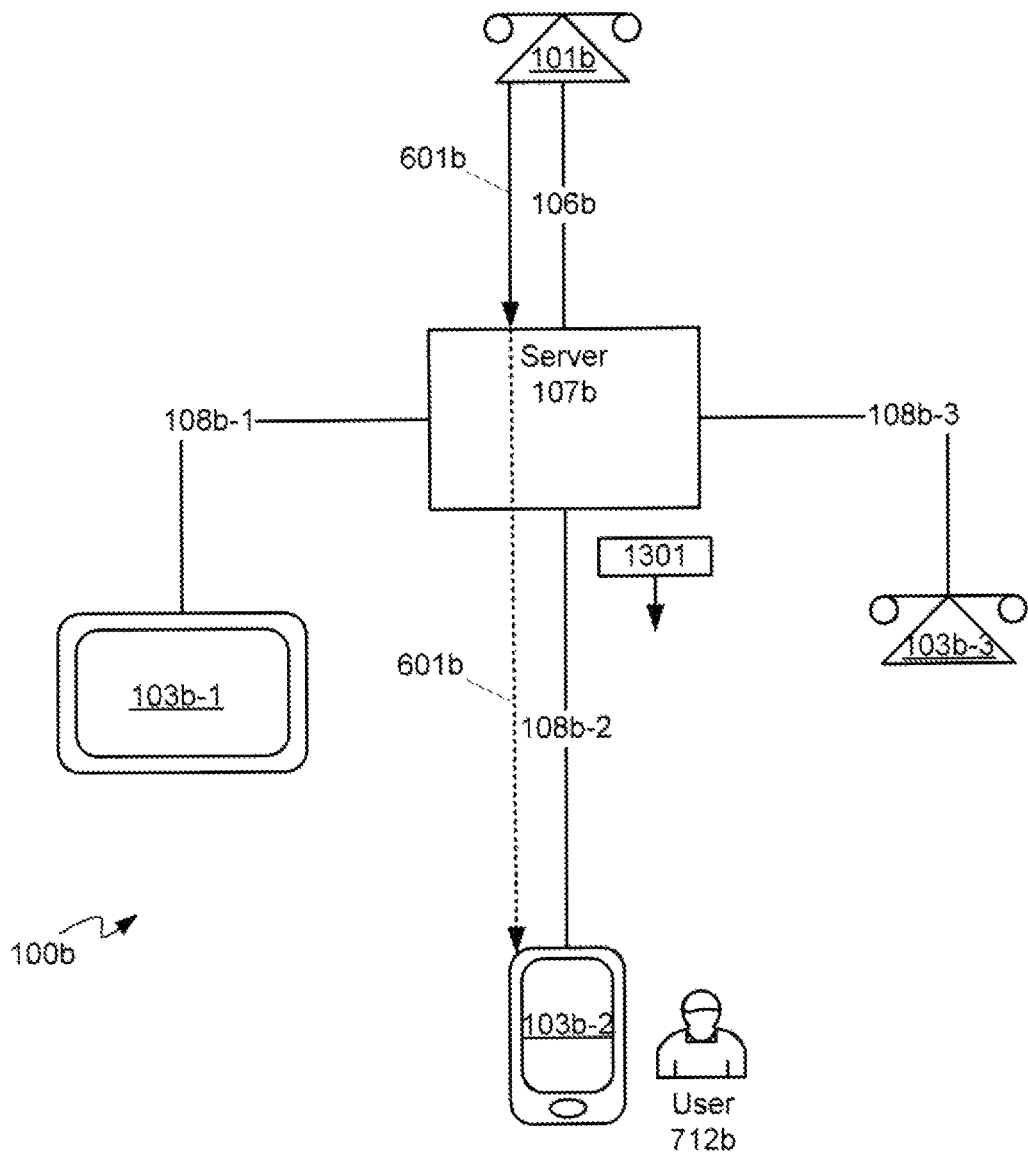
FIG. 13 depicts a system for call notifications to active communication devices, according to non-limiting implementations.

Further data indicative of the association can be stored at one or more of devices 103 (e.g. data 218, 318, 418) and/or at a network device, such as a server (not depicted, but see server 107b of FIG. 13).

It is yet further appreciated that a call from device 101 can be received at one of devices 103, such as device 103-1, while another of devices 103 are active, such as one or more of devices 103-2, 103-3, described in further detail below.

Figure 5:
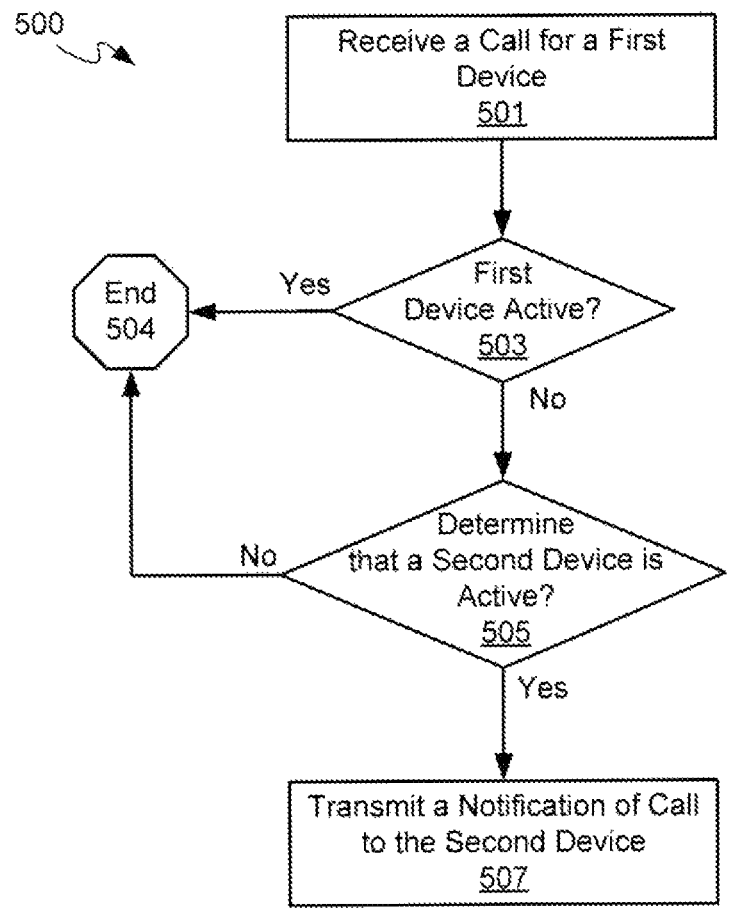
FIG. 5 depicts a method for call notifications to active communication devices, according to non-limiting implementations.
Figure 6:
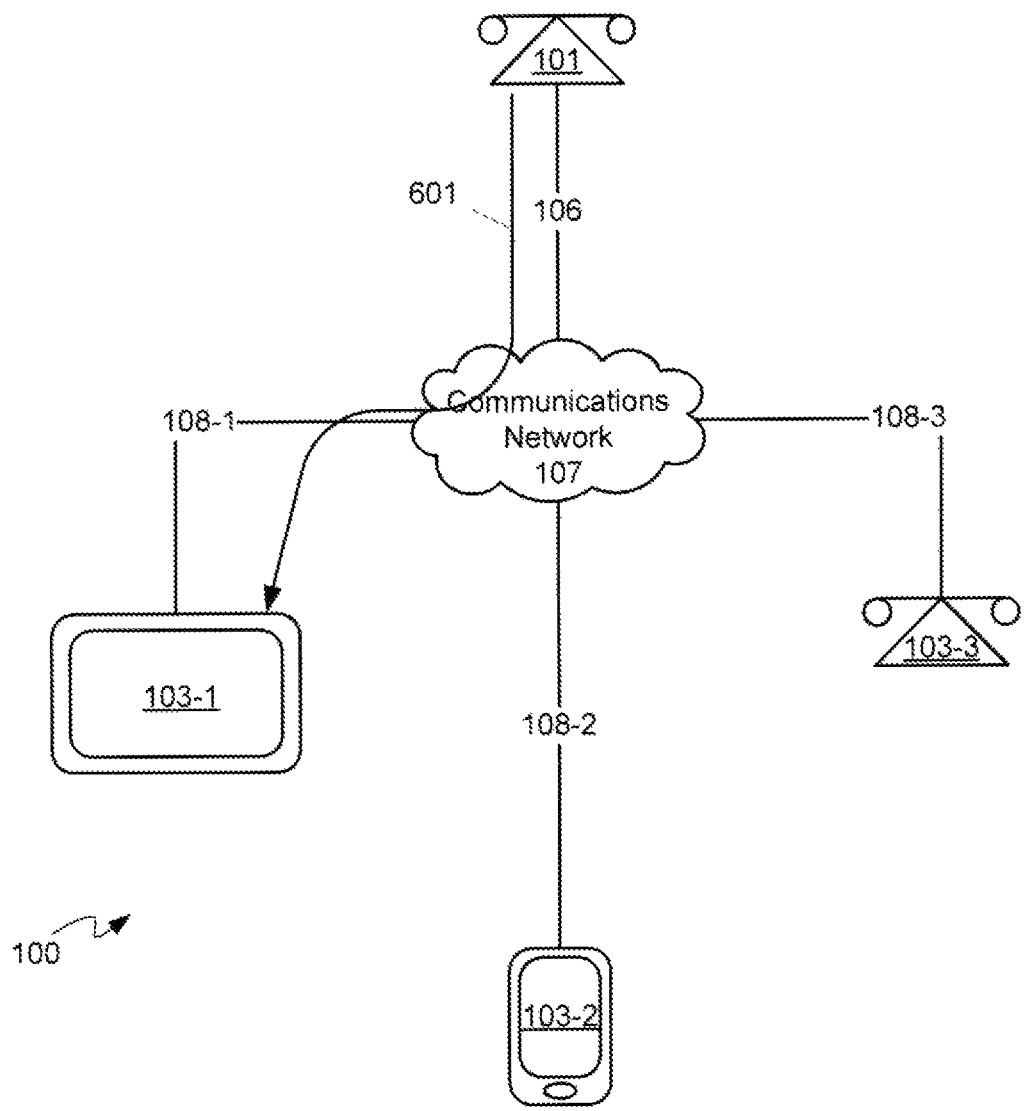
FIG. 6 depicts a system for call notifications to active communication devices, according to non-limiting implementations.
Figure 7:
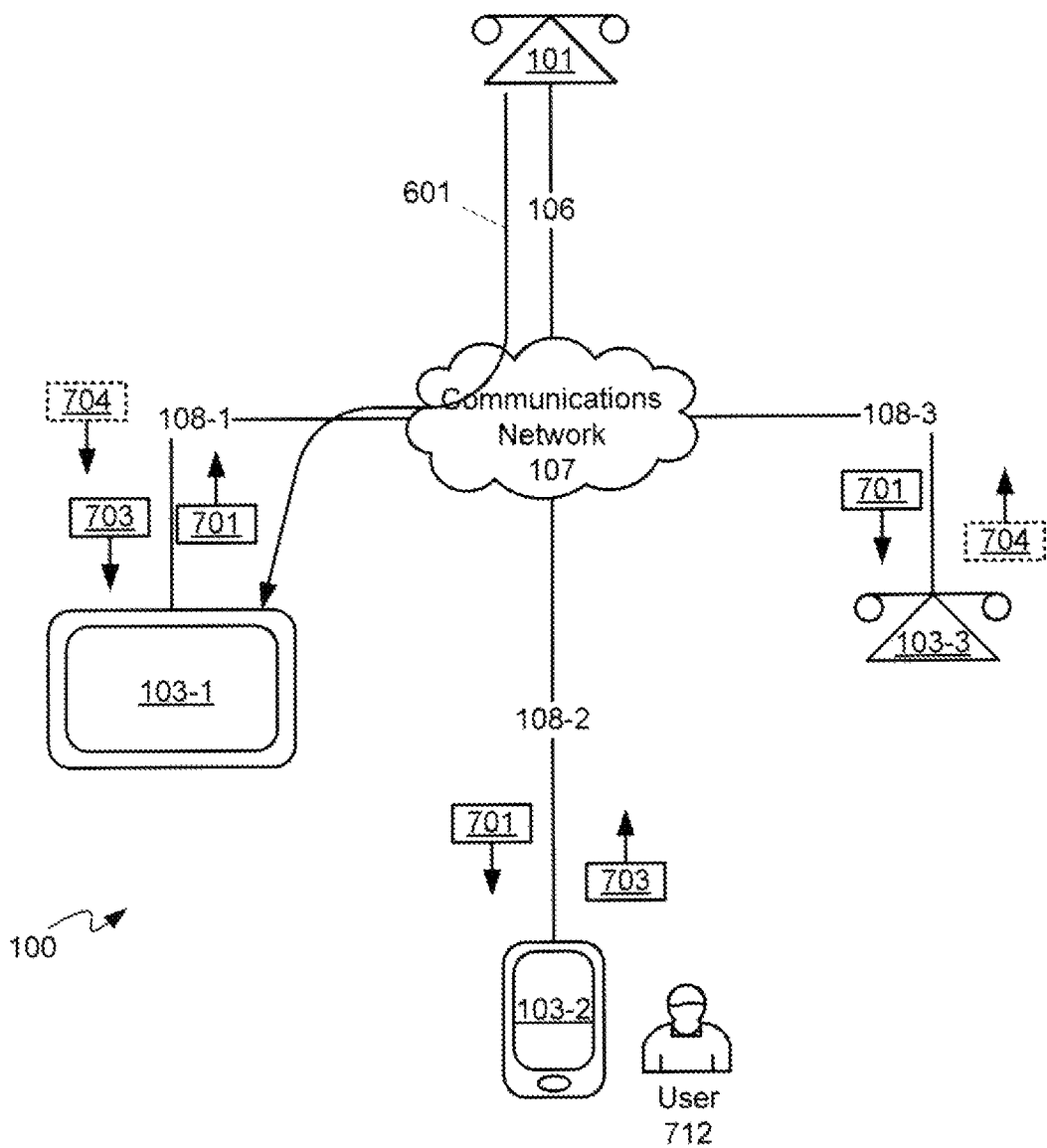
FIG. 7 depicts a system for call notifications to active communication devices, according to non-limiting implementations.

Attention is now directed to FIG. 5 which depicts a flowchart illustrating a method 500 of call notifications to active communication devices, according to non-limiting implementations. In order to assist in the explanation of method 500, it will be assumed that method 500 is performed using device 103-1. Furthermore, the following discussion of method 500 will lead to a further understanding of device 103-1 and its various components. However, it is to be understood that device 103-1 and/or method 500 can be varied, and need not work exactly as discussed herein in conjunction with each other, and that such variations are within the scope of present implementations. It is appreciated that, in some implementations, method 500 is implemented in device 103-1 by processor 208.

It is to be emphasized, however, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood that method 500 can be implemented on variations of device 103-1 as well, for example either of devices 103-2, 103-3.

Further, method 500 is described with reference to FIGS. 6, 7, 8 and 10, each of which are substantially similar to FIG. 1, with like elements having like numbers.

At block 501, a call is received at first device 103-1, for example via interface 228. For example, with reference to FIG. 6, device 101 is generally enabled to initiate a call 601, for example one or more of a voice call and video call, to device 103-1 via network 107, for example by transmitting call initiation data to one or more switching elements, such one or more switching servers, in network 107. The call initiation data can include, but is not limited to, an identifier of device 103-1, a virtual number associated with a switching server (which in turn forwards the call initiation data to device 103-1), and the like. In general, device 101 will transmit call initiation data over link 106, to network 107, where the call is in turn conveyed to device 103-1 via link 108-1.

It is appreciated that when call 601 is received at device 103-1, device 103-1 can optionally provide a notification of call 601, including but not limited to audio notifications, visual notifications, vibratory notifications and the like.

At an optional block 503, processor 208 determines whether device 103-1 is active. For example, a determination of whether device 103-1 is active can include, but is not limited to, call 501 being answered at device 103-1 (such that audio data, video data and the like can be exchanged between devices 101, 103-1) an indication of activity at input device 200, a detection of motion via one or more of microphone 226, video camera 230, and/or motion sensor 231. When activity is detected, method 500 ends at block 504 (i.e. a "Yes" decision at block 503). Otherwise, processor 208 determines that device 103-1 is inactive (i.e. a "No" decision at block 503). A determination of inactive can occur when one or more of: call 601 is unanswered at device 103-1 within a given period of time and/or after a given number of notifications and/or "rings"; and no activity is detected via one or more of microphone 226, video camera 230 and/or motion sensor 231.

However, it is appreciated that, in other implementations, block 503 does not occur and the remaining blocks of method 500 occur whether device 103-1 is active or inactive.

In any event, at block 505, processor 208 determines that a second device 103 is active. For example, in some implementations, and with reference to FIG. 7, device 103-1 can transmit a query 701 to devices 103-2, 103-3 by processing data 218 to determine network identifiers of devices 103-2, 103-3; query 701 is generally transmitted via network 107, to determine activity at devices 103-2, 103-3. Devices 103-2, 103-3 respond to query 701 with respective data 703, 704 transmitted to device 103-1 via network 107, data 703, 704 respectively indicative of activity at devices 103-2, 103-3.

It is further appreciated that each of devices 103-2, 103-3 can make a determination of activity using respective motion sensors 331, 431, input devices 300, 400, video cameras 330, 430 and/or microphones 326, 426, as described above with reference to device 103-1.

In any event respective data 703, 704 is indicative of whether or not a respective device 103-2, 103-3 is active. In other words, assuming device 103-2 is active, processor 208 can be enabled to determine that second device 103-2 is active by transmitting a query 701 to second device 103-2 and receiving a response (i.e. data 703) thereto.

In some implementations, when a given device is not active (i.e. inactive), no response to query 701 is transmitted. For example, again with reference to FIG. 7, assuming device 103-2 is active (e.g. a user 712 is using device 103-2 and/or activity determined as described above), and device 103-3 is inactive, data 703 is transmitted but data 704 is not transmitted. Indeed, in FIG. 7, it is assumed in a non-limiting example that device 103-3 is inactive and hence data 704 is optional.

In some implementations query 701 and data 703, 704 can be transmitted over a P2P (peer to peer) protocol, and hence determining whether devices 103-2, 103-3 are active or inactive can occur relatively in "real-time".

In yet further implementations, query 701 itself can be optional and whenever a change in activity occurs at a given device 103-2, 103-3, respective data 703, 704 are automatically transmitted to device 103-1. In yet further implementations, data 703, 704 are automatically transmitted periodically. Hence, device 103-1 is always aware of whether a given device 103 is active or inactive and hence determining whether devices 103-2, 103-3 are active or inactive can occur relatively in "real-time".

It is further appreciated that an automatic exchange of activity data, similar to data 703, 704, can occur between devices 103, such that each device 103 stores activity data of each other device 103 that is generally current and/or in "real-time". In other words, presence data associated with user 712 can be exchanged between devices 103, such that each device 103 stores data associated with a presence of user 712 at other devices 103.

In any event, returning to FIG. 5, at block 505, device 103-1 determines that second device 103-2 is active by processing data 703, regardless of how data 703 is obtained. Indeed, it is appreciated that data 703 can have been received prior to device 103-1 receiving call 601 (and stored, for example at data 218), such as in implementations where devices 103 exchange activity data periodically and/or when changes in activity occur at a given device. It is further appreciated that such exchanges of activity data can occur on a P2P network and/or on a P2P protocol.

In yet further implementations, a server in network 107 receives and stores activity data from devices 103 and transmits the activity to other devices 103. For example, see server 107b of FIG. 13 described below.

In other words, processor 208 is enabled to determine that second device 103-2 is active by receiving an indication of activity (i.e. data 703) from one or more of a second device 103-2 and a server enabled to communicate with first device 103-1 and second device 103-2.

Hence, it is yet further appreciated that, a device 103 can be determined to be active when device 103 is in use by a user as determined by one or more of an activity at input device and/or activity detected by one or more of a motion sensor, a video camera, a microphone and the like, as described above.

In other words a device 103 is determined to be active not simply by virtue of a device 103 being on and able to respond to queries, messages and the like. Rather a device 103 is determined to be active when activity is detected, for example at human-machine interfaces of a device 103, including but not limited to one or more of an input device, a motion sensor, a video camera, a microphone and the like, as described above. Alternatively, a device 103 is determined to be active via other types of activity at device 103 that do not involve a human-machine interface; for example, activity can be detected via a light sensor, sensing a cable being received (i.e. plugged in) at a communication interface (such as interface 328), and/or that data is traversing one or more of a cable and a communication interface. Either way, data 703 can comprise data indicative of activity at device 103-2, hence device 103-1 can determine that device 103-2 is active when data 703 is indicative of activity at device 103-2.

It is yet further appreciated that when device 103-1 receives data 703, 704, device 103-1 can determine which device 103 of a plurality of devices 103 is active. For example, each of data 703, 704 can indicate that respective devices 103-2, 103-3 are active. Hence, when more than one device 103 is active (for example user 712 might be using device 103-2 and a colleague and/or family member might be using device 103-3), one of the plurality of active devices 103 can be given a priority based, for example, of a position of respective network identifier in data 218 (e.g. see Table 1, described below); however any other manner of determining priority is within the scope of present implementations. In some implementation, device 103-2 can be assigned priority over device 103-3 as device 103-2 (e.g. a mobile communication device) is more likely to be used by user 712 associated with devices 103, than a house phone such as device 103-3.

In yet further implementations, priority of devices 103 can be dynamic such that a device 103 that is more active than other devices 103 in a given period of time is automatically given priority in data 218.

Figure 8:
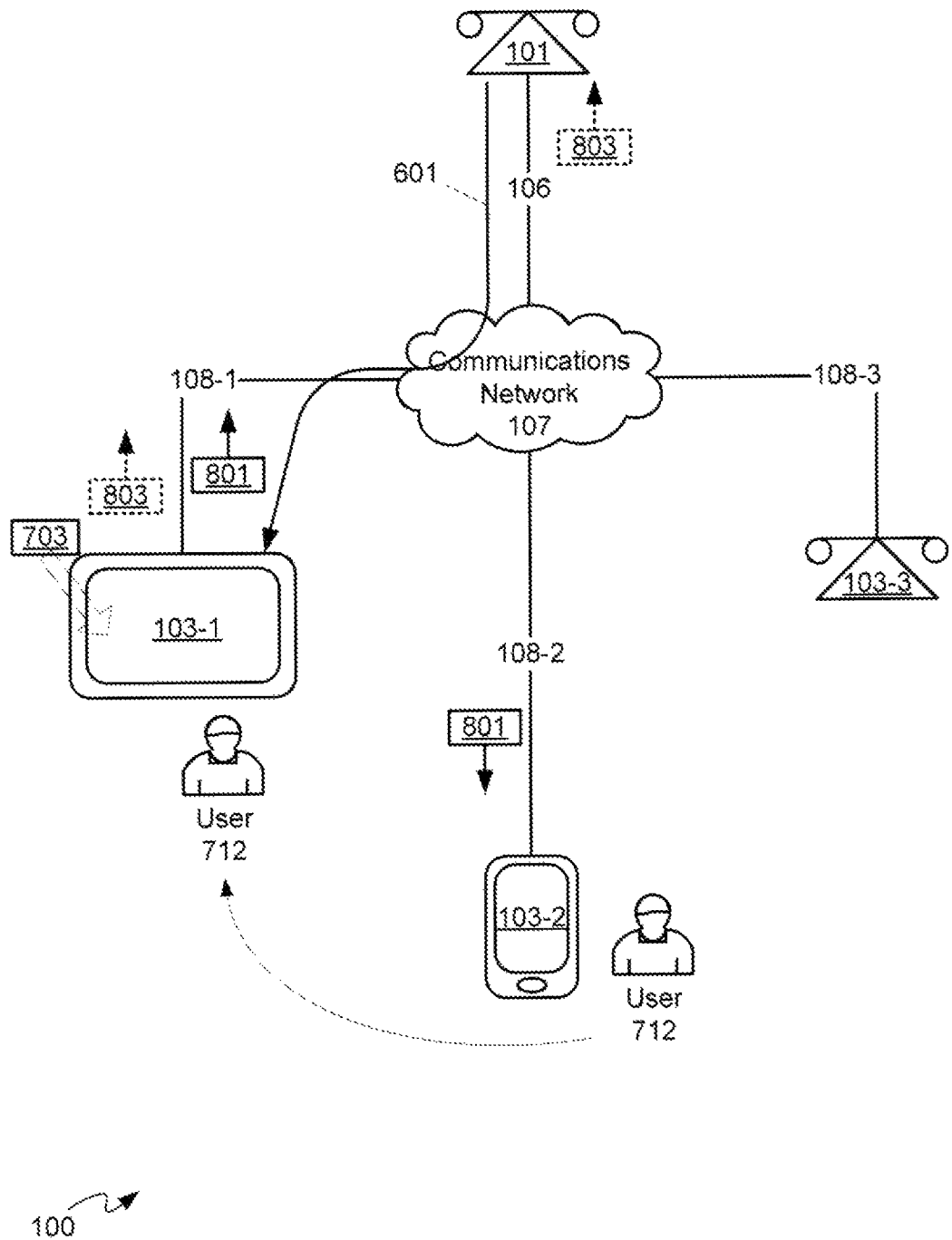
FIG. 8 depicts a system for call notifications to active communication devices, according to non-limiting implementations.

At block 507, and with reference to FIG. 8, device 103-1 transmits a notification 801 of call 601 to second device 103-2 via network 107. For example, device 103-1 transmits notification 801 in response to determining that second device 103-2 is active (i.e. a "Yes" decision at block 505). However, when no device 103 is active, block 505 does not occur, a notification of call 601 is not transmitted to second device 103-2 (i.e. a "No" decision at block 505) and method 500 ends.

Figure 9:
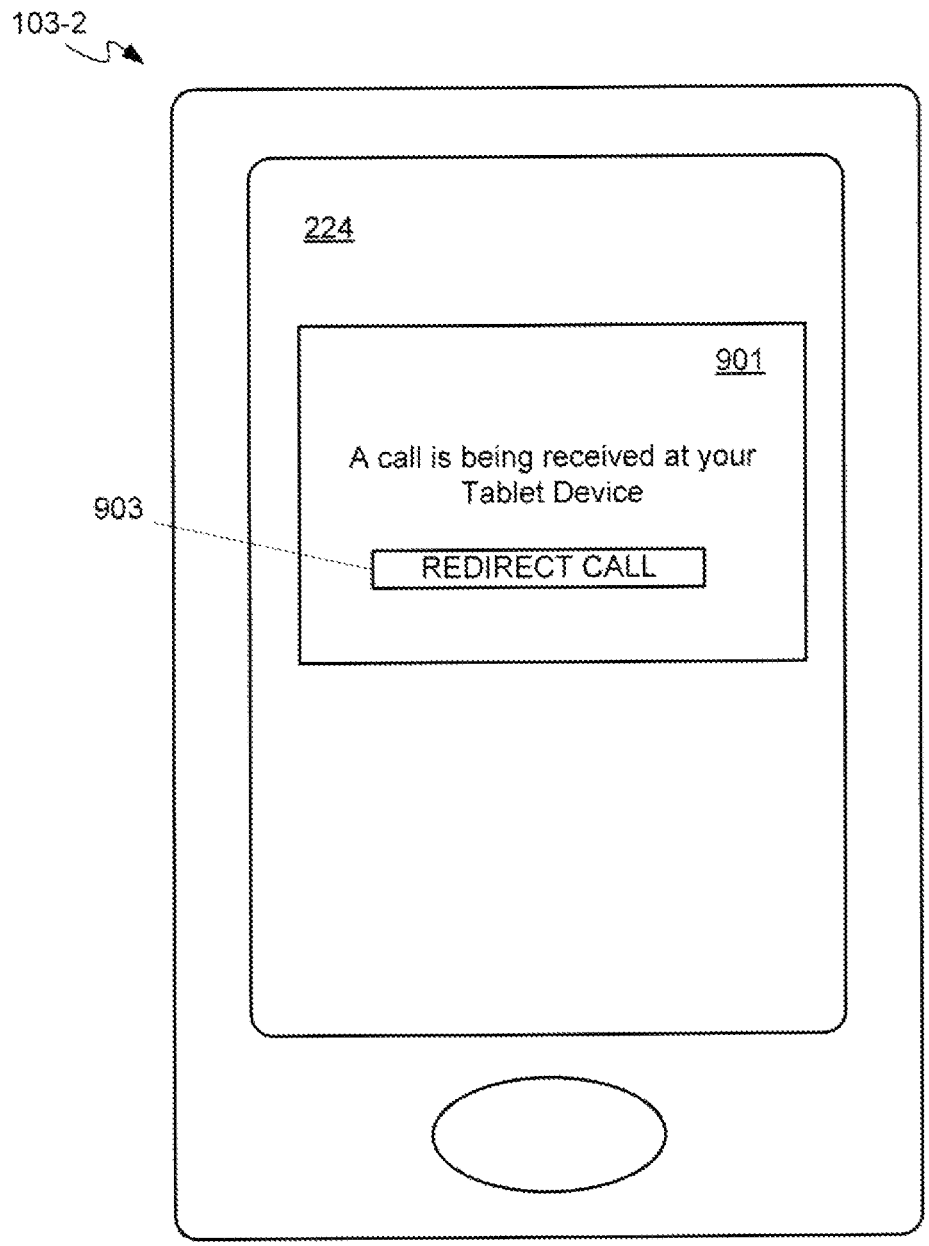
FIG. 9 depicts a graphic user interface at the device of FIG. 3 displayed when a call notification is received, according to non-limiting implementations.

Device 103-2 receives notification 801 and in response displays and/or renders a notification of call 801 at display 224, for example in a GUI (graphic user interface) 901 as depicted in FIG. 9 ("A call is being received at your Tablet Device"). In some implementations, when device 103-1 is proximal to device 103-2, user 712 can move to device 103-1, as depicted in FIG. 8, and cause device 103-1 to answer call 601: for example, input data for answering call 601 is received at input device 200.

In some alternative implementations, as also depicted in FIG. 8, device 103-1 further: answers call 601, places call 601 on hold; and transmits a second notification 803 to calling device 101, second notification 803 indicative of one or more of call 601 being placed on hold and a wait period for answering call 601 and the like. For example, call 601 can be answered, placed on hold, and notification 803 can be transmitted, notification 803 comprising an indication of one or more of instructions for waiting and a wait period for answering the call. For example, notification 803 can comprise one or more of an audio message and a visual message indicating that device 103-1 is trying to locate user 712 to take call 601, and an indication of a given wait time, such as a few minutes and the like. When call 601 is not answered within the given wait time, call 601 can be redirected to a voicemail system, either at device 103-1 or in network 107.

Figure 10:
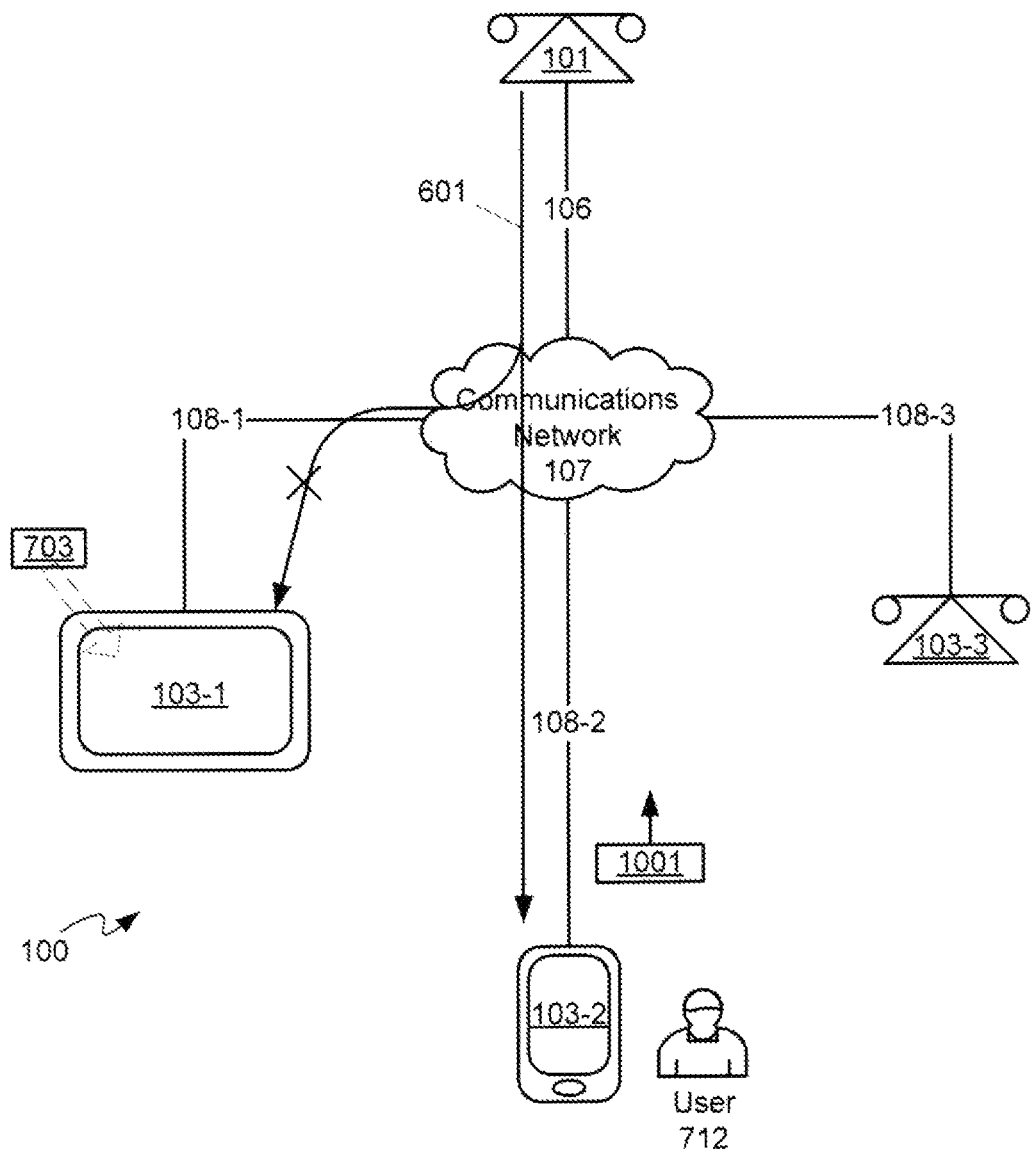
FIG. 10 depicts a system for call notifications to active communication devices, according to non-limiting implementations.

Alternatively, as also depicted in FIG. 9, in non-limiting example limitations, receipt of notification 801 at device 103-2 further cause device 103-2 to provide a selectable option 903 ("REDIRECT CALL") for transferring call 601 to device 103-2. Selectable option 903 can comprise a virtual button and the like. As depicted in FIG. 10, upon receipt of input data at input device 300 indicative of a selection of selectable option 903, device 103-2 transmits a signal 1001 to a switching element (not depicted) network 107, causing the switching element to redirect call 601 from device 103-1 to device 103-2.

Consider now implementations where call 601 comprises a video call and device 103-2 is active, but device 103-2 may or may not be capable of handling call 601. For example, while device 103-2 can comprise a video camera 330, device 103-2 may not be capable of acquiring video data in a video call due to processing capabilities and the like and/or a location of video camera 330 at device 103-2 (e.g. when video camera 330 is located at a side opposite display 324, device 103-2 cannot simultaneously capture a video of user 712 and provide video at display 324 visible to user 712).

Figure 11:
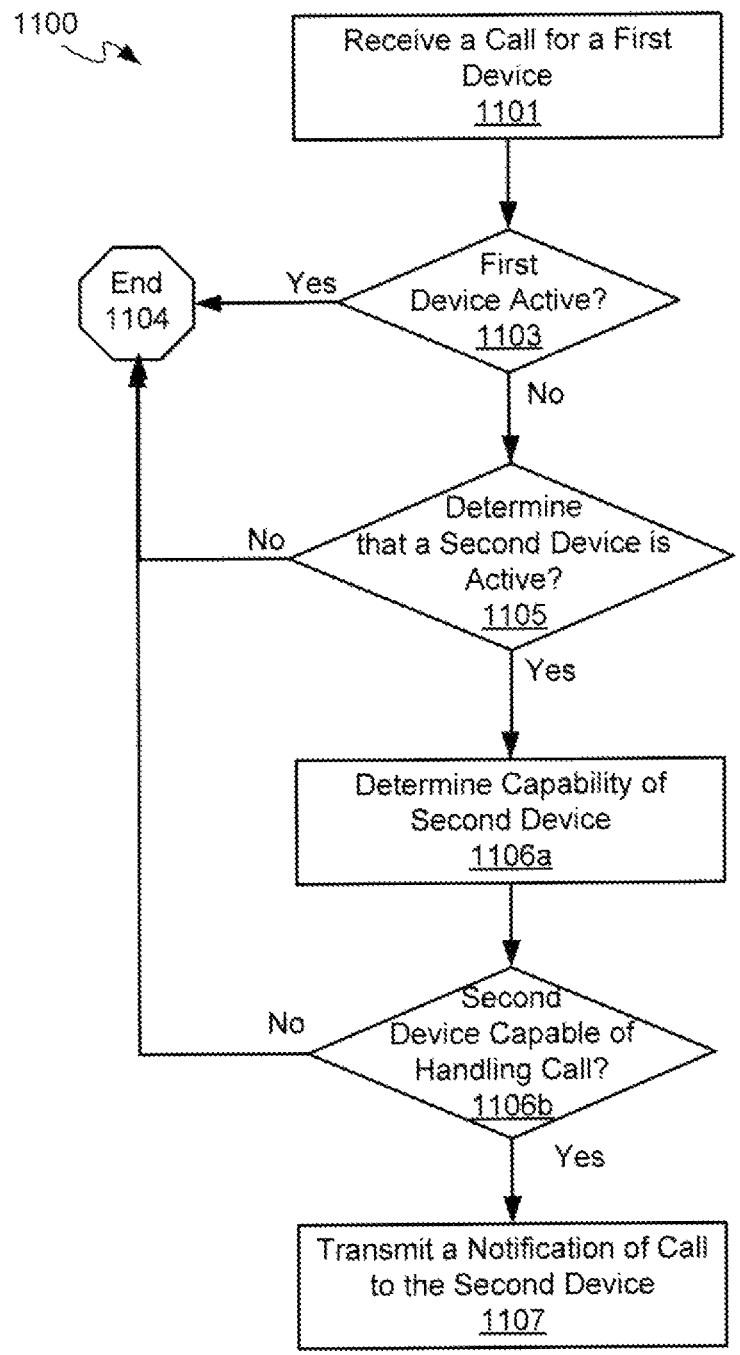
FIG. 11 depicts a method for call notifications to active communication devices, according to non-limiting implementations.

Hence, attention is directed to FIG. 11, which depicts an alternate method 1100 that can be implemented in system 100. Method 1100 is substantially similar to method 500, with like blocks having like numbers, however preceded by "11" rather than "5". For example, at block 1101, a first device 103-1 receives call 601 similar to block 501. At block 1103, a determination is made as to whether device 103-1 is active; if so, call 601 is answered at device 103-1 and method 1100 ends at block 1104, otherwise at block 1105 device 103-1 determines whether a second device 103-2 is active.

Presuming device 103-2 is active, at block 1106a, device 103-1 determines the capability of active device 103-2. For example, data 218 can further store capability data of devices 103, including but not limited to device 103-2. Alternatively, data 703 can comprise capability data of device 103-2. Hence, query 701 can further comprise a request for capability of devices 103-2, 103-3.

Hence, for example, when call 601 comprises a video call, and device 103-1 determines that device 103-2 is active, device 103-1 can determine one or more of: whether device 103-2 can handle a video call; whether device 103-2 comprises video camera 330; a location of video camera 330 at device 103-2 (whether video camera 330 can acquire video data proximal display 324); and whether video camera 330 is enabled for video calling. However, device 103-1 may simply determine "Yes" (and the like), device 103-2 can handle video calls, or "No" (and the like), device 103-3 cannot handle video calls without determining details of why or why not device 103-2 can handle video calls.

However, in some non-limiting implementations, at block 1106a, device 103-1 can determine whether active device 103-2 can handle a video call by processing data 218. In these implementations, data 218 can comprise the contents of Table 1, or the like:

TABLE 1

| Device | Audio Call | Video Call |
| --- | --- | --- |
| Identifier of 103-2 | Yes | Yes |
| Identifier of 103-3 | Yes | No |

While Table 1 is arranged in rows and columns, it is appreciated that Table 1 can be arranged in any suitable format. Further, Table 1 comprises a network identifier of each of devices 103-2, 103-3, as described above, and an indication of capabilities of each of devices 103-2, 103-3, specifically whether each of devices 103-2, 103-3 can handle audio calls and video calls. For example, as indicated in Table 1, device 103-2 can handle both audio calls and video calls; however, device 103-3 can handle audio calls but not video calls.

From Table 1, it is further appreciated that when a voice call is received at device 103-1, and device 103-1 subsequently determines that both devices 103-2, 103-3 are active, but only device 103-2 is capable of handling voice calls, then device 103-2 is notified of the voice call.

It is further appreciated that in implementations where data 218 comprises Table 1, data 218 has been previously provisioned, for example from previous capability data received from each of devices 103-2, 103-3, for example when device 103-1 first communicated with each of devices 103-2, 103-3 and/or when devices 103 were associated with one another.

In any event, at block 1106b, device 103-1 determines whether second device 103-1 is capable of handling call 601; if not (a "No" decision at block 1106b), method 1100 ends at block 1104 and call 601 can be redirected to a voicemail system or the like. However, when second device 103-2 is capable of handling call 601, at block 1107, a notification of call 601 is transmitted to second device 103-2. In some implementations, an option to transfer call 601 to device 103-2 is provide as depicted in FIG. 9; as it has already been determined that device 103-2 is capable of handling call 601, no technical issues should occur when call 601 is transferred to device 103-2. On the other hand, if blocks 1106a, 1106b did not occur, and device 103-2 was not capable of handling call 601, and call 601 was transferred to device 103-2, then technical issues with call 601 would be introduced. In other words, by determining technical capabilities of device 103-2 before devices 103-2 is notified of call 601, technical problems that could be introduced when transferring call 601 to device 103-2 are obviated and indeed avoided.

Hence, in some implementations, device 103-1 is generally enabled to transmit query 701 to at least second device 103-2 to determine both whether device 103-2 is active and to request capabilities of device 103-2; further more, device 103-1 is enabled to transmit notification 801 of call 601 to device 103-2 when a response to query 701 (i.e. data 703) is indicative that device 103-2 is capable of handling call 601.

In yet further implementations, device 103-2 is enabled to: determine that device 103-2 is both active and capable of processing call 601; and, transmit notification 801 of the call to device 103-2 when device 103-2 is both active and capable of processing call 601.

It is further appreciated that blocks 1105, 1106a, 1106b can occur in parallel and/or in one block. In other words, device 103-1 can be enabled to determine both whether device 103-2 is active and capable of handling call 601 in a generally simultaneous manner, and further determine whether device 103-2 is capable of handling call 601 when determining capability of device 103-2. Hence, blocks 1106a, 1106b can also occur in parallel and/or in one block. Further blocks 1105, 1106a, 1106b can occur in any given order. For example, device 103-1 can determine capability of device 103-2 before determining whether device 103-2 is active; if device 103-2 is not capable of handling call 103-2, then method 1100 can end before a determination of activity at device 103-2.

It is yet further appreciated that one or more of method 500 and method 1100 can be implemented in alternatives to system 100. For example attention is next directed to FIG. 12, which depicts a system 100a, substantially similar to system 100 with like elements having like numbers, however with an "a" appended thereto. Hence, system 100a comprises a device 101a enabled to communicate with at least one of a plurality of communication devices 103a-1, 103a-3, via link 106a, a communication network 107a, and respective links 108a-1, 108a-3. Further system 100a comprises device 103a-2 in communication with device 103a-1 via a link 1203. It is assumed in FIG. 12 that device 103a-2 is active (e.g. user 712a is using device 103a-2). Link 1208 can comprise any suitable link, including but not limited to a cell phone link, an NFC link, a Bluetooth™ link, a WiFi link, a WiMax link and the like. In other words, when device 103a-1 receives call 601a and determines that device 103a-2 is active (and alternatively capable of handling call 601a), device 103a-1 transmits a notification 1203 to device 103a-2, for example using link 1208. Notification 1203 can be similar to notification 801.

Figure 12:
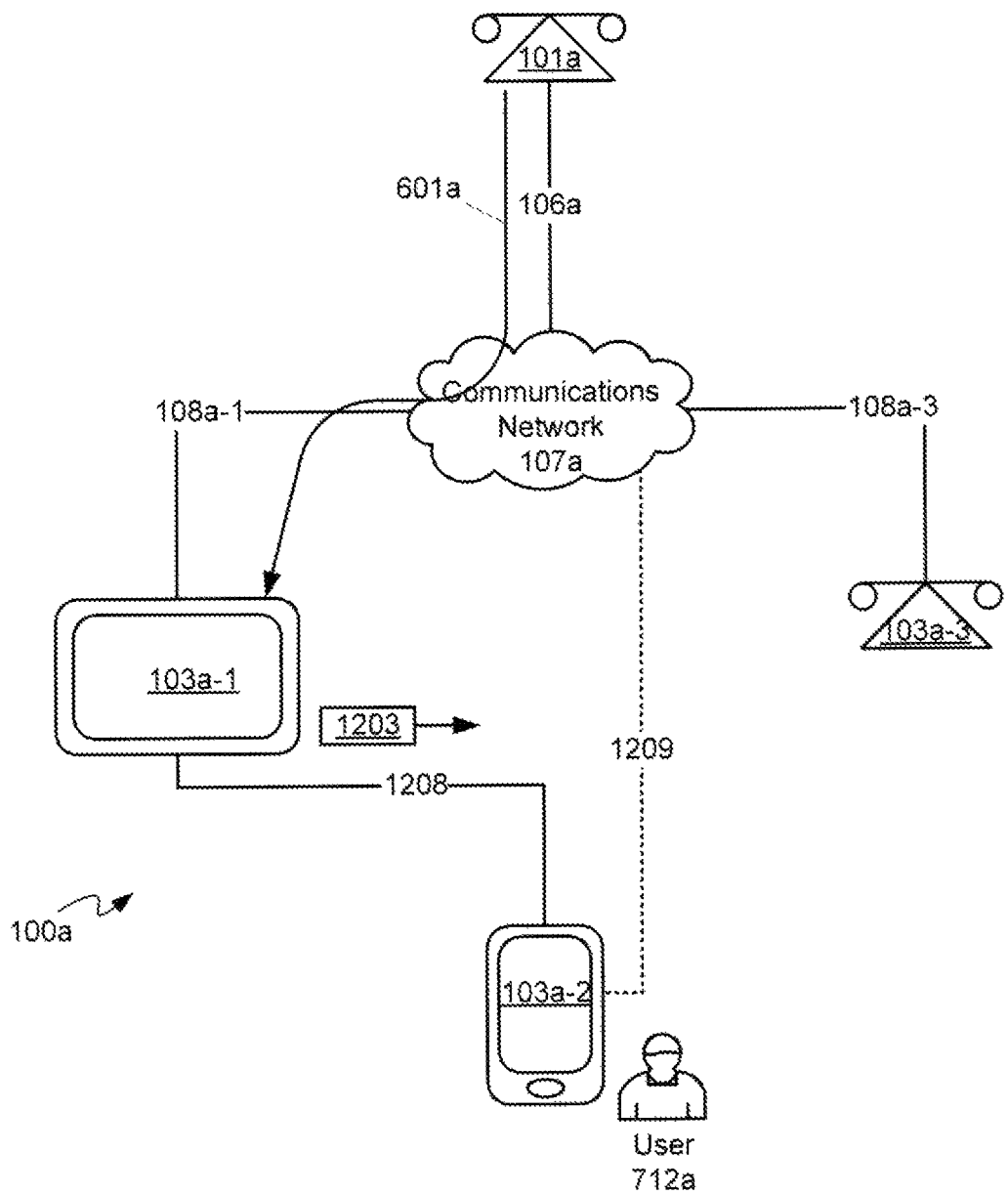
FIG. 12 depicts a system for call notifications to active communication devices, according to non-limiting implementations.

As further depicted in FIG. 12, device 103a-2 can alternatively be in communication with network 107a via an optional link 1209. For example, in these implementations, link 1208 can comprise an NFC link, such as a Bluetooth™ link, while link 1209 comprise a cellphone link. Device 103a-1 can determine which of links 1208, 1209 to transmit notification 1203; in some implementation the cheaper and/or most efficient of links 1208, 1209 is chosen to transmit notification 1203. Further when an option to transfer call 601a to device 103a-2 is selected, call 601a can be redirected to device 103a-2 via link 1208 (i.e. via device 103a-1) or via link 1209.

Attention is next directed to FIG. 13, which depicts a system 100b, substantially similar to system 100 with like elements having like numbers, however with a "b" appended thereto. Hence, system 100b comprises a device 101b enabled to communicate with at least one of a plurality of communication devices 103-1b, 103b-2, 103b-3, via link 106b, a server 107b, and respective links 108b-1, 108b-2, 108b-3. It is assumed in FIG. 13 that device 103b-2 is active (e.g. user 712b is using device 103b-2). Devices 103b-1, 103b-2, 103b-3 will also be referred to hereafter generically as a device 103b, and collectively as devices 103b. Furthermore, links 108b-1, 108b-2, 108b-3 will also be referred to hereafter generically as a link 108b, and collectively as links 108b.

Server 107b can be based on any well-known server environment including a module that houses one or more central processing units, volatile memory (e.g. random access memory), persistent memory (e.g. hard disk devices) and network interfaces to allow server 107b to communicate over links 106b, 108b. For example, server 107b can comprise a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 107b are contemplated. It is further more appreciated that server 107b can comprise any suitable number of servers that can perform different functionality of server implementations described herein. Functionality of server 107b will be described in further detail below.

Server 107b generally comprises a switching element in a communication network, such as network 107. For example server 107b can comprise a PBX (private branch exchange) and/or VoIP (Voice over Internet Protocol) server for switching and/or managing calls to devices 103. For example, server 107b can store an association between devices 103b in the form of data similar to data 218, 318, 418.

One or more of methods 500, 1100 can be implemented at server 107b, for example using a stored association between devices 103b. Hence, server 107b comprises a processor generally enabled to receive a call for a first device 103b-1; determine that a second device 103b-2 is active; and transmit a notification 1301 of call 601b to second device 103b. Server 1076 can transfer call 601b to second device 103b-2 when second device 103b-2 is active and first device 103b-1 is inactive. Hence, server 107b is generally enabled to communicate with at least first device 103b-1 and second device 103b-1; and, transfer call 601b to one or more of first device 103b-1 and second device 103b-2.

Hence, implementations described herein address situations where a user may have several devices and a user's active and/or preferred device is to be notified when a call, including but not limited to a video call, a video chat, and the like, is received at one of the user's other devices. For example, when a call (e.g. a video call) arrives at a first device, a call notification can be transmitted to an associated active device. A determination can be made as to whether the device to be notified is actively used and optionally whether the device is capable of handling the call. All of the associated devices are identified through network identifiers. Therefore, when a call is received at a first device, a link (e.g. a connection such as local link, Bluetooth™, WiFi, a cellular connection) between the first device and an associated second device is used to send a real time notification to the active device. For example: a video call may arrive on a user's tablet but the user is currently using a handheld device and is not aware of the call; and/or a video call may arrive on a user's handheld device but the handheld does not have a front facing camera. In this case the users tablet can be notified.

Further, in these scenarios the device receiving the call can detect and determine which is the best available network technology to use for the call and leverage selected network technology to notify the active device of the call by sending a real time notification, for example using IP (internet protocol) Messaging to the active device e.g. using Transport Layer Security (TLS) (and/or to other active device(s) as appropriate).

Those skilled in the art will appreciate that in some implementations, the functionality of devices 103, 103a, 103b, and server 107b can be implemented using pre-programmed hardware or firmware elements (e.g., application specific integrated circuits (ASICs), electrically erasable programmable read-only memories (EEPROMs), etc.), or other related components. In other implementations, the functionality of devices 103, 103a, 103b, and server 107b can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A mobile device comprising:
a processor; a communication interface; and one or more of: an input device; a motion sensor; at least one human-machine interface, the processor configured to:
receive, using the communication interface, a call at the mobile device, the mobile device being the mobile device the call is destined for;
monitor one or more of: the input device to determine when active typing data is received; the motion sensor to determine when motion sensor data is received; and the at least one human-machine interface to determine when human-machine interface data is received;
when one or more of active typing data, motion sensor data, and human-machine interface data is received in a given time period after the call is received, determine that the mobile device is active;
when one or more of active typing data, motion sensor data, and human-machine interface data is not received in the given time period after the call is received:

determine that the mobile device is inactive:
  transmit, using the communication interface, a query to the second device;
  receive, using the communication interface, a response from the second device indicating that the second device is one or more of: active; and capable of processing the call;
  process the response to determine that the second device is one or more of: active; and capable of processing the call; and,
  when the second device is one or more of: active; and capable of processing the call, transfer, using the communication interface, the call to the second device.

2. The mobile device of claim 1, wherein the processor is further configured to determine that the second device is active by receiving an indication of activity from the second device.

3. The mobile device of claim 2, wherein the indication of activity comprises one or more of respective active typing data respective motion sensor data, and respective human-machine interface data.

4. The mobile device of claim 1, wherein the query comprises a request for capabilities of the second device.

5. The mobile device of claim 1, wherein the processor is further configured to: determine that the second device is both active and capable of handling the call; and, transfer the call to the second device when the second device is both active and capable of handling the call.

6. The mobile device of claim 1, wherein the processor is further configured to:
  place the call on hold; and
  transmit a notification to a calling device, the notification indicative of one or more of instructions for waiting and a wait period for answering the call.

7. A method comprising:
  at a mobile device comprising; a processor; a communication interface; and one or more of: an input device; a motion sensor; at least one human-machine interface, receiving a call for the mobile device via the communication interface, the mobile device being the mobile device the call is destined for;
  monitoring, at the processor, one or more of: the input device to determine when active typing data is received; the motion sensor to determine when motion sensor data is received; and the at least one human-machine interface to determine when human-machine interface data is received;
  when one or more of active typing data, motion sensor data, and human-machine interface data is received in a given time period after the call is received, determining, at the processor, that the mobile device is active;
  when one or more of active typing data, motion sensor data, and human-machine interface data is not received in the given time period after the call is received:
    determining, at the processor, that the mobile device is inactive:
    transmitting, using the communication interface, a query to the second device;
    receiving, using the communication interface, a response from the second device indicating that the second device is one or more of active and capable of processing the call;
    processing, at the processor, the response to determine that the second device is one or more of active and capable of processing the call; and,
    when the second device is one or more of: active; and capable of processing the call, transferring, using the communication interface, the call to the second device.

8. The method of claim 7, further comprising determining that the second device is active by receiving an indication of activity from one or more of the second device and a server configured to communicate with the first device and the second device.

9. The method of claim 8, wherein the indication of activity comprises one or more of: respective active typing data, respective motion sensor data, and respective human-machine interface data.

10. The method of claim 7, wherein the query comprises a request for capabilities of the second device.

11. The method of claim 7, further comprising: determining that the second device is both active and capable of handling the call; and, transferring the call to the second device when the second device is both active and capable of handling the call.

12. The method of claim 7, further comprising:
  placing the call on hold; and
  transmitting a notification to a calling device, the notification indicative of one or more of instructions for waiting and a wait period for answering the call.

13. A non-transitory computer program product, comprising a computer usable medium having a computer readable program code adapted to be executed to implement a method comprising:
  at a mobile device comprising; a processor; a communication interface; and one or more of: an input device; a motion sensor; at least one human-machine interface, receiving a call for the mobile device via the communication interface, the mobile device being the mobile device the call is destined for;
  monitoring, at the processor, one or more of: the input device to determine when active typing data is received; the motion sensor to determine when motion sensor data is received; and the at least one human-machine interface to determine when human-machine interface data is received;
  when one or more of active typing data, motion sensor data, and human-machine interface data is received in a given time period after the call is received, determining, at the processor, that the mobile device is active;
  when one or more of active typing data, motion sensor data, and human-machine interface data is not received in the given time period after the call is received:
    determining, at the processor, that the mobile device is inactive:
    transmitting, using the communication interface, a query to the second device;
    receiving, using the communication interface, a response from the second device indicating that the second device is one or more of active and capable of processing the call;
    processing, at the processor, the response to determine that the second device is one or more of active and capable of processing the call; and,
    when the second device is one or more of: active; and capable of processing the call, transferring, using the communication interface, the call to the second device.

* * * * *